March 9, 1965  R. L. RICHARDS  3,173,058
CONTROL APPARATUS
Filed April 28, 1961  3 Sheets-Sheet 1
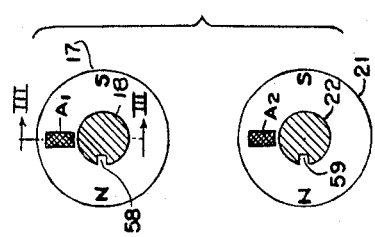
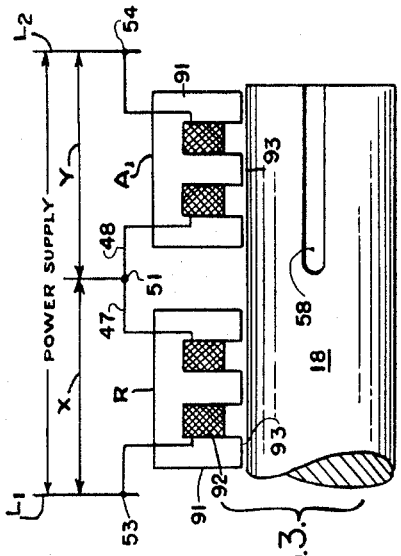
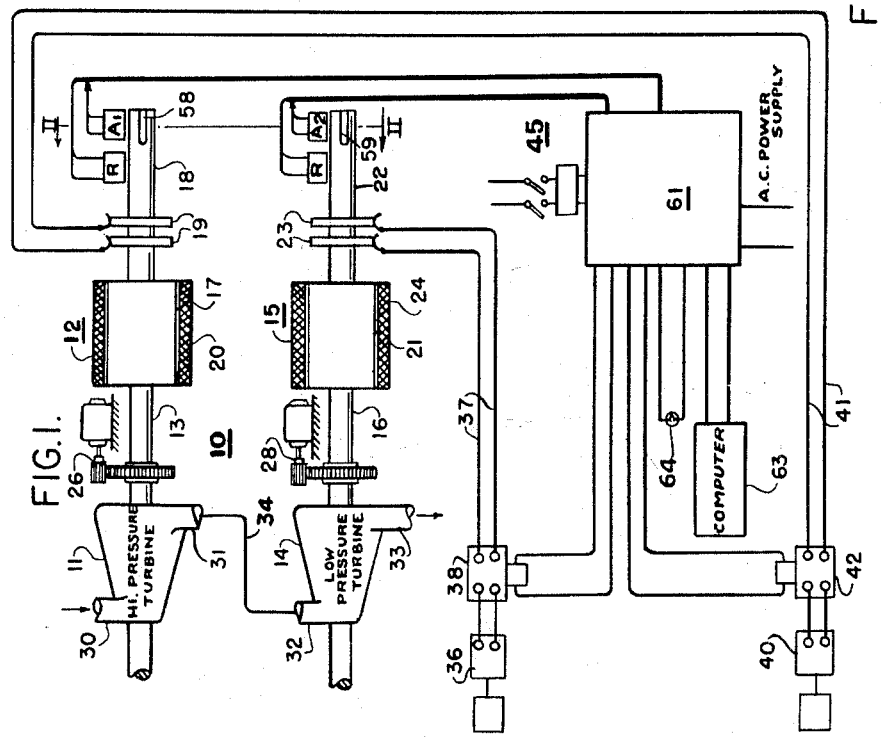
INVENTOR
ROBERT L. RICHARDS

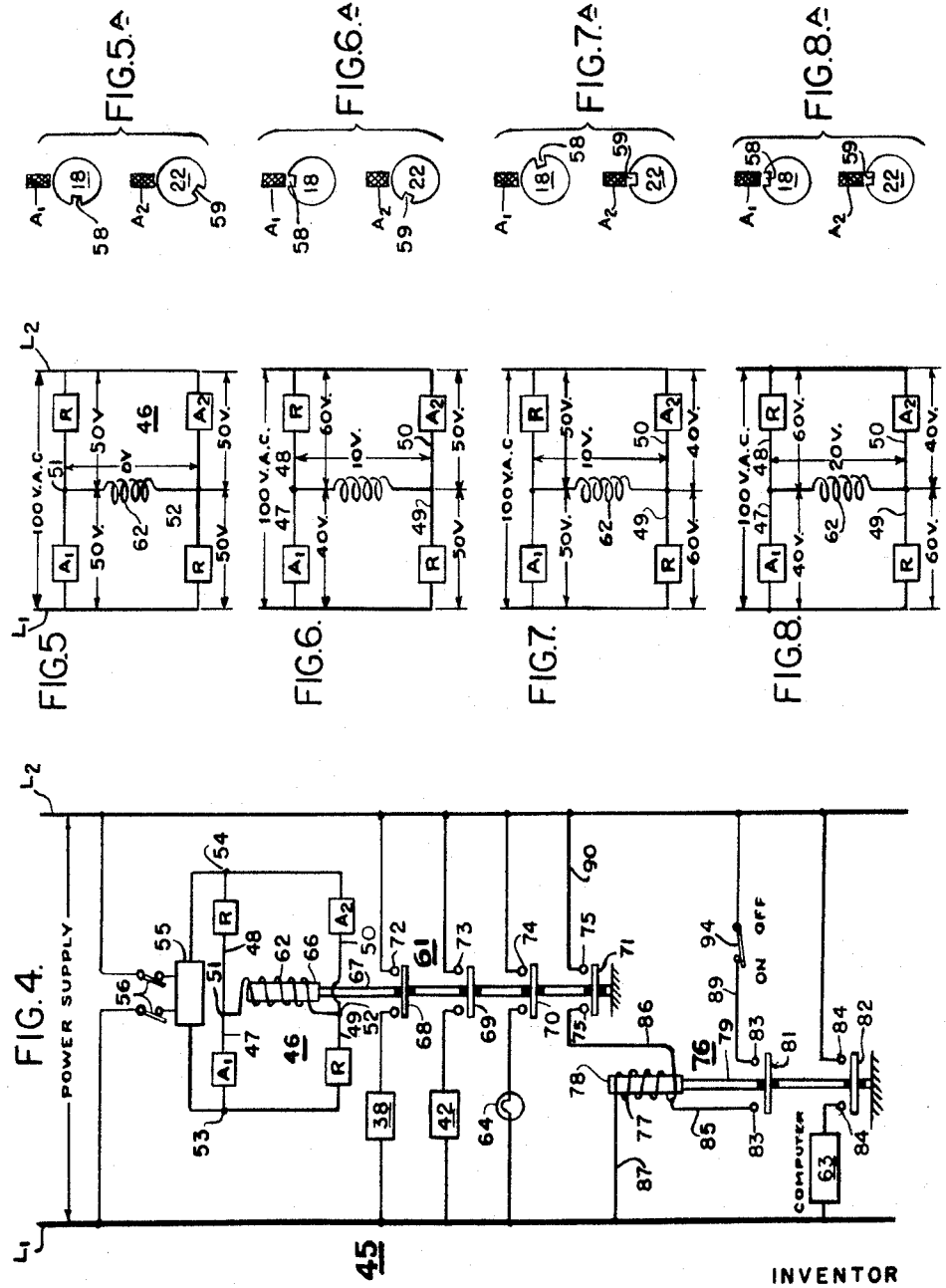

March 9, 1965
R. L. RICHARDS
3,173,058
CONTROL APPARATUS
Filed April 28, 1961
3 Sheets-Sheet 3
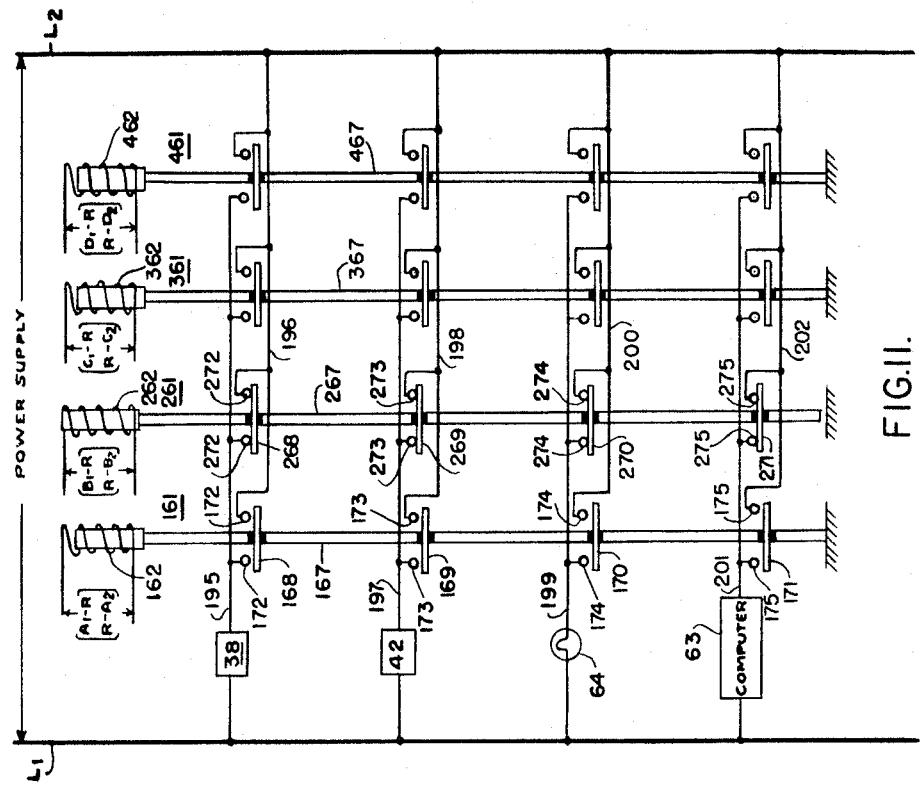
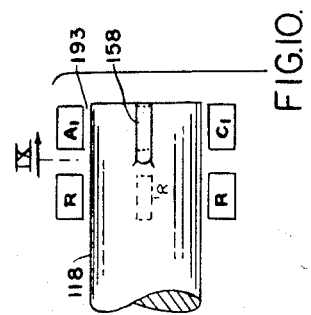
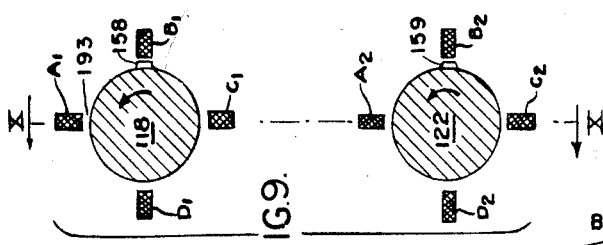
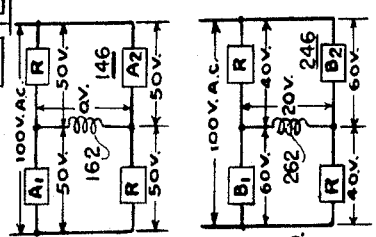
INVENTOR
ROBERT L. RICHARDS
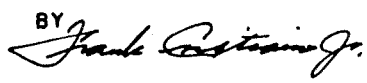

United States Patent Office 3,173,058
Patented Mar. 9, 1965

3,173,058
CONTROL APPARATUS
Robert L. Richards, Media, Pa., assignor to Westinghouse Electric Corporation, East Pittsburgh, Pa., a corporation of Pennsylvania
Filed Apr. 28, 1961, Ser. No. 106,259
10 Claims. (Cl. 317—6)

This invention relates to apparatus for sensing the "in-phase" relationship of a pair of rotatable shafts. The in-phase relationship may be defined as a rotative position of one shaft that substantially coincides with the rotative position of the other shaft.

One of the main objects of the invention is to provide apparatus of the above type in which the in-phase sensing means provides an electrical signal that may be employed to automatically initiate a control function.

Another object is to provide apparatus of the above type for sensing the in-phase relationship of two slowly rotating turbine-generator rotors and automatically initiating a subsequent function. The subsequent function may, for example, include the simultaneous application of D.C. excitation voltage to the field coils of both generators to electrically interlock or synchronize the two generator rotors before bringing them up to rated speed.

During initial startup of a turbine power plant, the turbine-generator rotor is slowly rotated at a speed ranging from 3 to 30 r.p.m. by a motor driven turning gear mechanism for reasons well known in the art.

In cross-compound connected power plants which include a first turbine-generator unit and a second turbine-generator unit driven by turbines at different pressures, for example, a high pressure and a low pressure, both unit are initially slowly rotated by individual turning gear mechanism and, during this slow speed rotation, the two units are electrically interconnected by simultaneously applying D.C. excitation voltage to the field coils of both generators. The turbine-generator rotors are then jointly brought up to speed by admission of pressurized elastic motive fluid such as steam. Before the D.C. voltage may be safely applied to both generator field coils, it is essential that the two turbine-generator rotors be "in-phase" with each other.

Heretofore, many schemes have been employed for visually detecting the in-phase relationship of the two rotors by an operator in order to enable him to decide the proper instant for applying the excitation voltage. Such arrangements have heretofore been employed with varying degrees of success, depending upon the skill and experience of the operator.

However, with the advent of automation in steam turbine-generator power plants, it is desirable to sense the in-phase relationship of the two turbine-generator rotors and subsequently automatically apply the D.C. field excitation voltage to the generator field coils. In addition to the above automatic function, it is also desirable to initiate other associated functions and operations incidental to starting the turbine-generator power plant and bringing it up to rated speed. For example, it is desirable to provide a signal to a computer mechanism indicative of excitation of the field coils and synchronization of the two turbine-generator rotors, so that the computer mechanism may initiate or monitor the functions of related auxiliary and/or control devices, as well known in the art.

Briefly, in accordance with the invention, there is provided a balanced electrical bridge circuit having a first pair of serially connected legs and a second pair of serially connected legs, each of the legs including one electrical impedance member. The impedance members are arranged in two pairs, each pair including a fixed impedance member and a variable impedance member. Means such as an electrical relay coil interconnected between the first pair of legs and the second pair of legs is further provided for sensing the condition of balance and unbalance in the bridge circuit. The first pair of impedance members are disposed in radially spaced relation with a shaft portion of the high pressure turbine-generator rotor, while the second pair of impedance members are disposed in similarly radially spaced relation with a shaft portion of the low pressure turbine-generator rotor. The two shafts are of substantially circular cross section so that, during rotation, the air gaps between the shafts and the associated fixed impedance members are maintained substantially constant. However, that portion of each shaft which rotates past the variable impedance members is provided with an axially elongated recess (or projection) arranged with reference to the poles of its generator rotor. Hence, when the two rotors are in phase, the two recesses are disposed in the same rotative positions relative to each other. During rotation, the air gaps between the shafts and their associated variable impedance members remains unchanged except during the brief time interval that the recesses are disposed in alignment with their associated variable impedance members.

The two variable impedance members are disposed in the diametrically opposed legs of the bridge circuit. Hence, when only one of the recesses is disposed in registry with its associated variable impedance member the bridge becomes partially unbalanced and the voltage drop across the relay coil is insufficient to actuate the relay. However, when both recesses are disposed in registry with their associated variable impedance members at the same time, the first pair of serially connected legs becomes unbalanced in one direction while the second pair of serially connected legs become unbalanced in the opposite direction. The voltage drop across the relay coil at this time is equal to twice the unbalance attained in each pair of serially connected legs. The potential thus impressed across the relay coil is effective to actuate the relay which, in turn, is effective to connect a source of D.C. voltage to the field coils of the two generators, thereby electrically interlocking the two rotors and insuring that they are jointly brought up to rated speed upon application of motive fluid to the turbines. The relay may further be provided with additional contacts to complete a circuit to a computer or monitoring device and/or a visible signal device such as a lamp.

With the above arrangement, the in-phase relationship of the two shafts is detected when they are in only one in-phase position. Hence, the in-phase condition may not be detected for a considerable period of time, even though the two shafts attain the in-phase relationship in other rotative positions. To increase the probability of detecting in-phase relationship in a shorter period of time, a plurality of electrical bridge circuits of the above type may be employed; each having the same arrangement of fixed and variable impedance members as above. However, in this arrangement, the variable impedance members are disposed in an annular spaced array about their associated shafts. For example, if four bridge circuits are employed, the variable impedance members in the first pairs of serially connected legs may be disposed at 12, 3, 6 and 9 o'clock on one shaft, while the variable impedance members in the second pairs of serially connected legs may be similarly disposed about the second shaft.

The above and other objects are effected by the invention as will be apparent from the following description taken in connection with the accompanying drawings, forming a part of this application, in which:

FIG. 1 is a highly diagrammatic view illustrating one embodiment of the invention, in connection with a cross compound turbine-generator power plant;

FIG. 2 is an enlarged sectional view taken on line II—II of FIG. 1;

FIG. 3 is an axial section taken on line III—III of FIG. 2;

FIG. 4 is a schematic electrical diagram illustrating the bridge circuit and associated electrical apparatus arranged in accordance with the invention;

FIGS. 5 and 5A are views showing representative voltage drops attained in the bridge circuit when the two shafts are disposed in one possible relative position;

FIGS. 6 and 6A, and FIGS. 7 and 7A are views similar to FIGS. 5 and 5A, respectively, but showing representative voltage drops attainable in the bridge circuit when the two shafts are disposed in other possible relative positions;

FIGS. 8 and 8A are views similar to FIGS. 5 and 5A, respectively, but showing representative voltage drops attained in the bridge circuit when the two shafts are in phase with each other;

FIG. 9 is a sectional view taken on line IX—IX of FIG. 10 and similar to FIG. 2 but showing another embodiment of the invention;

FIG. 10 is a view taken on line X—X of FIG. 9;

FIG. 11 is a schematic electrical diagram illustrating the circuitry employed in the second embodiment;

FIG. 12 is a schematic view of one of the bridge circuits employed with the second embodiment and showing representative voltage drops attained in the bridge under one set of conditions; and FIG. 13 is a diagram similar to FIG. 12 but illustrating representative voltage drops when the two shafts are in an in-phase position detectable by one of the bridge circuits.

Referring to the drawings in detail, in FIG. 1 there is shown a turbine-generator power plant 10 of the cross-compound type including a high pressure turbine 11 drivingly connected to an electrical generator 12 by a shaft 13, and a low pressure turbine 14 drivingly connected to an electric generator 15 by a shaft 16. The generator 12 is provided with a rotor 17 having an extended shaft portion 18 carrying a pair of slip rings 19 connected to the field coils 20 of the generator 12. In a similar manner, the generator 15 is provided with a rotor 21 having an extended shaft portion 22 carrying a pair of slip rings 23 connected to the field coils 24 of the generator 15.

The turbine-generator unit 11, 12 is provided with a motor operated turning gear mechanism 26 for jointly rotating the generator rotor 17 and the turbine rotor (not shown) at a slow speed for reasons well known in the art. In a similar manner, the turbine-generator unit 14, 15 is provided with motor operated turning gear mechanism 28 for slowly rotating the generator rotor 21 and the turbine rotor (not shown). The high pressure turbine 11 is provided with a steam inlet 30 and a steam outlet 31. Likewise, the low pressure turbine 14 is provided with a steam inlet 32 and a steam outlet 33. High pressure steam is supplied from a suitable source (not shown) to the steam inlet 30 and is expanded in the turbine 11 to motivate the same subsequent exhaustion through the outlet 31. After the steam is exhausted through the outlet 31, it is directed to the steam inlet 32 of the low pressure turbine 14 by a conduit indicated at 34. The steam undergoes additional expansion in the low pressure turbine to motivate the same before subsequent exhaustion through the outlet 33.

The turning gear mechanisms 26 and 28 are arranged to drive the associated shafts 13 and 16, respectively, at slightly different speeds. Hence, during slow speed rotation of the two turbine generators, the two shaft portions 18 and 22 periodically attain an in-phase relation with respect to each other. By referring to FIG. 2, it will be noted that the generator rotors 17 and 21 are of the two pole type, each having a north pole N and a south pole S. As shown in FIG. 2, the generator rotors 17 and 21 are "in-phase." That is, their north and south poles are disposed in the same rotative position relative to each other.

A motor driven D.C. generator 36 is employed to provide D.C. excitation voltage to the field coils 24 through a pair of electrical conductors 37 having interposed therein an electrically actuated circuit breaker mechanism 38. The conductors 37 are disposed in suitable slidable contact with the slip rings 23. Also, a motor driven D.C. generator 40 is employed to provide D.C. excitation voltage to the field coils 20 through a pair of suitable conductors 41 disposed in slidable contact with the slip rings 19 and having interposed therein an electrically actuated circuit breaker 42.

When it is determined that the two generator rotors 17 and 21 are in-phase, the circuit breakers 38 and 42 are jointly energized, thereby electrically exciting the field coils 24 and 20, respectively. Hence, as well understood in the art, the two generators are electrically synchonized or interlocked and will subsequently rotate at precisely the same speed. After synchronization of the two generators, motive steam is applied to the turbines 11 and 14 and the turning gear mechanisms 26 and 28 are disengaged. The generators are then brought up to rated speed by the turbines. Thereafter, control of the power plant 10 may be attained in any suitable manner (not shown).

As thus far described, the apparatus is substantially conventional and requires visual detection of the in-phase relationship of the two shafts 18 and 22 and manual operation of the two circuit breakers 38 and 42.

In accordance with the invention, there is provided apparatus, generally designated 45, for automatically detecting the in-phase relation of the two shafts 18 and 22 and for jointly automatically actuating the circuit breakers 38 and 42.

The apparatus 45, as best shown in FIG. 4, comprises an electrical bridge circuit 46 having a first pair of serially connected legs 47 and 48 and a second pair of serially connected legs 49 and 50. The first pair of legs 47, 48 and the second pair of legs 49, 50 are interconnected at their midpoints 51 and 52 and suitable voltage is applied to the connections 53 and 54 from a power supply (not shown) by lines $L_1$, $L_2$. The voltage may be either A.C. or D.C. and is preferably regulated by a suitable voltage regulator 55. The power supply thereto may be controlled by a suitable switch 56. It will now be seen that the bridge circuit 46 is substantially of the Wheatstone type.

A pair of variable impedance members $A_1$ and $A_2$ are disposed, respectively, in the diametrically opposed bridge legs 47 and 50, while a pair of fixed reference impedance members R are disposed in the diametrically opposed bridge legs 48 and 49. The impedance members $A_1$, $A_2$ and R are of substantially identical impedance characteristics. Hence, the bridge circuit 46 is inherently balanced, since the impedance ratio.

$$\frac{A_1}{R \text{ (leg 48)}} = \frac{R \text{ (leg 49)}}{A_2}$$

This may better be understood by stating that the voltage drop across $A_1$ is equal to the voltage drop across R in leg 48, while the voltage drop across R in leg 49 is equal to the voltage drop across $A_2$. With the bridge in the thus balanced position, the potential across the interconnecting points 51 and 52 is zero.

Referring again to FIG. 1, the variable impedance member $A_1$ and its associated fixed impedance member R are disposed in equally radially spaced relation with the shaft 18, while the variable impedance member $A_2$ and its associated fixed impedance member R are disposed in equally radially spaced relation with the shaft 22. The cross sectional shape of the two shafts 18 and 22 in the region disposed adjacent the fixed impedance members R is substantially cylindrical so that, regardless of the rotative positions of the shafts, the air gaps formed between the fixed impedance members and their associating shafts is constant or unchangeable. That portion of the shaft 18 disposed adjacent to and rotating past the variable impedance member $A_1$ is also of cylindrical shape but has an axially elongated recess 58 formed therein. Hence, during rotation of the shaft 18, the air gap formed between the variable impedance member $A_1$ and the shaft is substantially constant through all portions of travel of the shaft therepast with the exception that, when the recess 58 is disposed in radial alignment with the variable impedance member $A_1$, the length of the air gap is suddenly increased with attendant decrease in impedance of the variable impedance $A_1$. In a similar manner, the shaft 22 is provided with an elongated recess 59 for varying the impedance of the variable impedance member $A_2$. As illustrated in FIG. 2, the recesses 58 and 59 are disposed in radial alignment with the north poles N of their respective rotors 17 and 21.

An electrical relay 61 having an inductive winding or coil 62 affording the interconnection between points 51 and 52 of the bridge is employed to control the actuation of the two circuit breakers 38 and 42. In addition thereto, the relay 61 may further be employed to provide a signal to an electronic computer or monitoring device 63 and an electrical signalling member such as a lamp 64.

The relay 61 may be of any suitable multiple contact type. However, for illustration purposes it has been shown as having a magnetic core member 66 slidably received within the inductive winding 62 and having an elongated rod structure 67 carrying a plurality of bridging contacts 68, 69, 70 and 71 arranged in suitably insulated relation with each other. Each of the bridging contacts 68, 69, 70 and 71 is cooperatively associated with a pair of stationary contacts 72, 73, 74 and 75, respectively, arranged in such a manner that when the relay is in the deenergized position all of the contacts are disengaged.

The relay contacts 68 and 72 are arranged to complete a circuit from the power supply lines $L_1$, $L_2$ through the circuit breaker 38; the relay contacts 69 and 73 are arranged to complete a circuit from the lines $L_1$, $L_2$ through the circuit breaker 42; and the relay contacts 70 and 74 are arranged to complete a circuit from the lines $L_1$, $L_2$ through the signal lamp 64. The contacts 71 and 75 are arranged to energize a holding circuit through the computer 63, which circuit includes a electrical relay, generally indicated 76, having an inductive winding 77 within which is slidably received a magnetic core 78. A rod member 79 is attached to the core 78 and is provided with a pair of bridging contacts 81 and 82 disposed in insulated relationship with each other. The relay 76 is also of the normally open type and further includes a pair of stationary contacts 83 cooperatively associated with the bridging contact 81 and a pair of stationary contacts 84 cooperatively associated with the bridging contact 82. The left-hand stationary contact 83 is connected to the winding 77 by a conductor 85 disposed in parallel with a conductor 86 which, in turn, connects the winding 77 with the left-hand stationary contact 75. The other end of the winding 77 is connected to line $L_1$ of the power supply by a conductor 87, while right-hand contacts 83 and 75 are connected to the other line $L_2$ by conductors 89 and 90, respectively.

The impedance members $A_1$, $A_2$ and R may be of any suitable type. For example, their reactance may be either inductive or capacitive. However, as illustrated in FIG. 3, wherein impedance members $A_1$ and R in bridge legs 47 and 48 are shown, they are of the inductive type typically comprising an E-shaped magnetic armature 91 having three legs extending toward the associated generator shaft 18 and having an inductive coil 92 formed about the central leg. As well known in the art, when the coil 92 is energized with A.C. current it induces a magnetic field in the armature 91 which extends across the air gap 93 formed between the ends of the legs and the surface of the rotatable shaft 18. The shaft 18 completes the magnetic circuit. As well known in the art, as the length of the air gap is increased, the magnetic reluctance of the magnetic circuit is increased, thereby reducing the inductive reactance of the impedance member and thereby reducing the voltage drop across the impedance member.

Since the impedance member R is disposed adjacent the cylindrical portion of the shaft 18, its air gap 93 is maintained constant and therefore its impedance is held to a constant value. Although the variable impedance member $A_1$ may be structurally identical to the impedance member R, it is disposed in the region of the shaft 18 having the recess 58 formed therein. Hence, during all rotating positions of the shaft 18, except for the brief period of time when the slot 58 is disposed immediately opposite the legs of the armature 91, the impedance of the impedance member $A_1$ is constant and substantially identical to that of the impedance member R. However, when the slot 58 is in alignment with the armature 91 of the member $A_1$, the air gap is suddenly increased in length with a concomitant increase in magnetic reluctance of the magnetic circuit and and reduction in the inductive reactance of the impedance member $A_1$, thereby reducing the voltage drop across the impedance member $A_1$. From the above, it will now be seen that when the shaft 18 and the impedance members R and $A_1$ are relatively disposed in the position shown in FIG. 3, the voltage drop X across impedance member R is equal to the voltage drop Y across the impedance member $A_1$.

Referring to FIG. 5A, it will be noted that the positions of the shafts 18 and 22 with relation to their associated variable impedance members $A_1$ and $A_2$, respectively, is such that neither of the slots 58 and 59 are disposed in alignment with their associated variable impedance members. With the shafts in this position and assuming the voltage across lines $L_1$, $L_2$ to be 100 volts A.C., by referring to FIG. 5 it will be noted that the voltage drop across each of the legs of the bridge 46 is 50 volts and the bridge is in a substantially balanced condition. Accordingly, the voltage drop across the relay winding 62 is 0 volts and the relay 61 is in the deenergized or open position (as shown in FIG. 4).

Referring to FIG. 6A, it will be noted that the recess 58 is disposed in alignment with the variable impedance member $A_1$, so that the voltage drop thereacross is reduced while the voltage drop across the impedance member $A_2$ is normal. By referring to FIG. 6, it will be seen that the bridge is now in a partially unbalanced position. That is, the serially connected legs 47 and 48 are unbalanced, while the serially connected legs 49 and 50 are balanced. The voltage drop across the variable impedance member $A_1$ is now 40 volts while the voltage drop across the fixed impedance member R (leg 48) is increased to 60 volts. Hence, the voltage drop across the relay winding 62 is now 10 volts. By forming the relay 61 to require a voltage drop for energization greater than attained by partial unbalance of the bridge circuit, i.e., more than 10 volts, the unbalance in FIG. 6 is insufficient to actuate the relay 61, so that the relay contacts are still maintained in their open positions.

FIG. 7A is somewhat similar to FIG. 6A but shows the reverse condition. That is, the recess 59 in shaft 22 is disposed in registry with its associated variable impedance member $A_2$ while the shaft 58 is out of registry with its associated variable impedance member $A_1$. As shown in FIG. 7, the unbalance now occurs in the serially connected legs 49 and 50, with a drop of 40 volts across variable impedance member $A_2$ and a 60 volt drop across the impedance member R (leg 49). Here again, the voltage drop across the relay coil 62 is 10 volts and is inadequate to actuate the relay 61.

In FIG. 8A the two shafts 18 and 22 are disposed in an in-phase condition and with their recesses 58 and 59 disposed in alignment with their associated variable impedance members $A_1$ and $A_2$, respectively. By referring to FIG. 8, it will be seen that the upper serially connected legs 47 and 48 are now unbalanced in one direction, while the lower serially connected legs 49 and 50 are unbalanced in the opposite direction, thereby providing a voltage drop across the relay coil 62 of 20 volts or double that shown in FIGS. 6 and 7. Since the relay 61 is arranged to be actuated at a potential of more than 10 volts, the 20 volt drop across the relay coil 62 is sufficient to actuate the magnetic core member 66 and its associated bridging contacts 68 to 71 inclusive, thereby completing the circuits through the circuit breakers 38 and 42, the lamp 64 and the relay 76.

The circuit breakers 38 and 42, preferably are of the type which "lock in" upon energization and remain in the locked in position until tripped. Accordingly, the circuit breakers 38 and 42 are jointly actuated to complete the circuits from the D.C. generators 36 and 40 to the field coils 24 and 20 of the generators 15 and 12, respectively. As previously explained, since the field coils 24 and 20 are jointly excited when the rotors 21 and 17 of the two generators are in proper phase relationship to assume such energization, the two generators 15 and 12 are thus electrically interlocked and may be jointly brought up to speed, after disengagement of the turning gear mechanisms 26 and 28, by subsequent admission of motive steam to the turbines 11 and 14. As well understood in the art, after the two generators are thus electrically synchronized their speeds will be identical regardless of the variations in the electrical loads that they provide (not shown).

During the initial acceleration of the generators, the recesses 58 and 59 concomitantly sweep into and out of alignment with their associated variable impedance members $A_1$ and $A_2$. Hence the bridge 46 is alternately balanced and unbalanced during every revolution of the shafts, thus alternately energizing and deenergizing the relay 61. This specific manner of operation has no effect on the circuit breakers 38 and 42, since they lock in as previously described. However, the signal lamp 64 is alternately energized and deenergized to visually indicate that the two shafts are being jointly rotated in the "in-phase" condition.

The computer device 63 typically requires a signal of longer duration than the circuit breakers 38 and 42 for well known reasons. However, the relay 76 is energized by the momentary engagement of the relay contacts 71 and 75 and moves its bridging contacts 81 and 82 into engagement with their associated stationary contacts 83 and 84, respectively. When the contacts 81 and 83 are in engagement with each other, a secondary circuit across the power lines $L_1$, $L_2$ is completed through conductors 89 and 85 establishing a parallel or "holding" circuit through the winding 77 which is effective to thereafter maintain the relay 76 in the energized position, even though the circuit through the relay contacts 71 and 75 is interrupted. Hence, the contacts 82 and 84, completing the circuit through the computer 63, are maintained in the circuit making position for as long a period as required. When it is desired to terminate the circuit through the computer 63, the holding circuit through the relay 76 may be interrupted by moving a suitable manually operated switch 94 in conductor 89 to the off position, thereby deenergizing the relay winding 77 and permitting the bridging contacts 81 and 82 to move out of contact with their associated stationary contacts. Subsequent thereto, the bridge circuit 46 may be deenergized by moving the switch 56 to the off position.

Since the variable impedance members $A_1$ and $A_2$ in the embodiment described above are disposed at 12 o'clock, the bridge circuit 46 is effective to detect the in-phase relationship between the two shafts 18 and 22 when the in-phase relationship occurs at 12 o'clock (the time that the two recesses 58 and 59 are disposed in alignment with their respective variable impedance members $A_1$ and $A_2$). However, since the two shafts 18 and 22 are rotated at slow but different speeds by the turning gear mechanisms 26 and 28, respectively, the in-phase relationship of the two shafts may momentarily be first obtained at other clock positions, i.e., when the two recesses are not disposed in alignment with their associated variable impedance members. A considerable period of time may thus elapse before the in-phase condition can be detected by the bridge circuit 46.

FIGS. 9 to 13 inclusive show a second embodiment of the invention in which the in-phase relationship of the two shafts may be detected at a plurality of predetermined clock positions.

Referring now specifically to FIGS. 9 and 10, there is shown an arrangement including a plurality of variable impedance members $A_1$, $B_1$, $C_1$ and $D_1$, arranged in an annular array about the periphery of a rotatable shaft 118 and disposed at 12, 3, 6 and 9 o'clock, respectively. An equal plurality of fixed reference impedance members R, peripherally spaced about the shaft at the same clock locations, are also employed. In a similar manner, an equal plurality of variable impedance members $A_2$, $B_2$, $C_2$ and $D_2$ are disposed in an annular array about a rotatable shaft 122. Also, an equal plurality of fixed reference impedance members R are disposed in an annular array about the shaft 122 at the same clock locations.

As shown in FIG. 12, the variable impedance members $A_1$ and $A_2$, together with their associated reference impedance members R are connected into a bridge 146 which may be substantially identical with the bridge 46 described in connection with the first embodiment and having the winding 162 of a relay 161 interposed therein. The variable impedance members $B_1$ and $B_2$, together with their associated reference impedance members R are connected in a bridge circuit 246 similar to the bridge circuit 46 of the first embodiment and having the winding 262 of a relay 261 interposed therein (see FIG. 13).

The shafts 118 and 122 may be similar to the shafts 18 and 22, respectively, described in connection with the first embodiment. However, in this embodiment the shafts 118 and 122 are provided with raised projections or ribs 158 and 159, respectively, instead of the recesses 58 and 59 of the first embodiment. The projections 158 and 159, are employed to change the length of the air gaps 193 defined by the variable impedance members $A_1$, $B_1$, $C_1$ and $D_1$, and thereby to vary the impedance of these members. However, with this arrangement, when the projection 158 is disposed in alignment with one of its associated variable impedance members, such as member $B_1$ (as illustrated in FIG. 9), the length of the air gaps 193 is decreased. Here again, although the impedance members may be of either the capacitive or inductive types, they have been illustrated as being of the inductive type. Hence, with decrease in the air gaps the magnetic reluctance of the magnetic circuit is decreased with concomitant increase in the inductive impedance of the associated variable impedance member and an increase in voltage drop thereacross.

The bridges 146 and 246 are normally balanced. Representative balanced voltage drop values during the balanced conditions are illustrated in FIG. 12 in conjunction with the bridge 146. It will be noted that the voltage drop across the relay winding 162 is zero. However, when the two shafts 118 and 122 are disposed in a predetermined in-phase rotative position, for example, at 3 o'clock as illustrated in FIG. 9, the bridge having the associated impedance members is momentarily unbalanced in the same manner as the first embodiment. FIG. 13 illustrates representative unbalanced voltage drop values attained at this time. Under such conditions, the voltage drop through the relay winding 262 is sufficient to actuate the associated relay 261.

The variable impedance members $C_1$, $C_2$ and their associated reference impedance members R; and the variable impedance members $D_1$, $D_2$ and their associated reference impedance members R, are interposed in bridge circuits (not shown) similar to bridge circuits 146 and 246, and having relays 361 and 461, respectively, interposed therein (see FIG. 11).

With this arrangement it is possible to detect the in-phase relation of the two shafts when the projections 158 and 159 are disposed at 6, 9 and 12 o'clock, in addition to the 3 o'clock position shown. Hence, the in-phase condition of the two shafts may be detected by one of the four bridge circuits in a considerably shorter period of time than the single bridge circuit 46 shown in the first embodiment.

As illustrated in FIG. 11, the relays 161, 261, 361 and 461 may be substantially identical to each other and to the relay 61 previously described in connection with the first embodiment, and are actuated by their associated relay windings 162, 262, 362 and 462, respectively. The relay 261 is illustrated in the energized position, while the other relays are illustrated in the deenergized positions.

The relay 161 is provided with an actuating rod 167 carrying bridging contacts 168, 169, 170 and 171 arranged to engage sets of associated stationary contacts 172, 173, 174 and 175.

In a similar manner, the relay 261 is provided with a plurality of bridging contacts 268, 269, 270 and 271 carried by an actuating rod 267 and cooperatively associated with stationary contacts 272, 273, 274 and 275, respectively.

The remaining relays 361 and 461 are also provided with contact structure similar to that of relays 161 and 261 described above. A conductor 195 is employed to connect the left-hand stationary contacts (such as 172 and 272) to the power supply line $L_1$, while a conductor 196 is provided for connecting the right-hand stationary contacts (such as 172 and 272) to the power supply line $L_2$. In a similar manner, a pair of conductors 197 and 198 are employed to connect the left-hand contacts 173 and 273 to the line $L_1$ and the right-hand contacts 173 and 273 to the line $L_2$, respectively. A pair of conductors 199 and 200 are employed to connect the contacts 174 and 274, and a pair of conductors 201 and 202 are employed to connect the contacts 175 and 275, respectively, to power supply lines $L_1$ and $L_2$ in a similar manner.

With the above arrangement, when the bridge circuit 246 is unbalanced by the variation in impedance of the associated impedance members $B_1$ and $B_2$, due to the in-phase rotative positions of shafts 118 and 122, the relay winding 262 is energized to actuate the actuator rod 267. Accordingly, the bridging contacts 268, 269, 270 and 271 are moved into engagement with their associated stationary contacts and the following circuits are attained across lines $L_1$ and $L_2$:

(1) Circuit breaker 38, conductor 195, stationary contacts 272, bridging contact 268 and conductor 196.

(2) Circuit breaker 42, conductor 197, stationary contacts 273, bridging contact 269 and conductor 198.

(3) Signal lamp 64, conductor 199, stationary contacts 274, bridging contact 270 and conductor 200.

(4) Computer 63, conductor 201, stationary contacts 275, bridging contact 271 and conductor 202.

From the above, it will be seen that when the two shafts 118 and 122 are in the in-phase condition with their projections 158 and 159 disposed at 3 o'clock, the relay 261 is effective to jointly connect the D.C. generators 36 and 40 (FIG. 1) to the generator field windings 24 and 20, respectively. The relays 161, 361 and 461 remain in the deenergized positions, as illustrated in FIG. 11.

Should the two shafts 118 and 122 assume an in-phase rotative position with their projections 158 and 159 at 12 o'clock, the bridge circuit 146 is unbalanced in the same manner as bridge circuit 246 above. Hence, the relay 261 will be deenergized and its actuator rod 267 will drop to the contact disengaging position, while the relay 161 is energized and its actuator rod 167 will be moved upwardly to its contact engaging position. Under these conditions, the following circuits are completed across lines $L_1$, $L_2$:

(1) Circuit breaker 38, conductor 195, stationary contacts 172, bridging contact 168, and conductor 196.

(2) Circuit breaker 42, conductor 197, stationary contacts 173, bridging contact 169 and conductor 198.

(3) Signal lamp 64, conductor 199, stationary contacts 174, bridging contact 170 and conductor 200.

(4) Computer 63, conductor 201, stationary contacts 175, bridging contact 171 and conductor 202.

In the event that the shafts 118 and 122 attain an in-phase condition with their projections 158 and 159 disposed at 9 o'clock, the relay 361 is energized to complete the circuits through the circuit breakers 38 and 42, the signal lamp 64 and the computer 63, while in the event that the in-phase condition is obtained at 6 o'clock, the relay 461 is actuated to complete the above circuits.

In this embodiment, the circuit to computer 63 has been simplified for clarity. However, it must be understood that if it is desired to maintain the circuit to the computer 63 after disengagement of the various relay contacts, a holding relay arrangement, similar to the relay 76 described previously and shown in FIG. 4, may be employed.

It will now be seen that the invention provides an arrangement for automatically sensing the in-phase relationship of a pair of rotatable shafts and for automatically initiating a subsequent control function.

It will further be seen that the invention provides an arrangement for automatically detecting the in-phase relationship of two turbine-generator rotors and for automatically connecting the D.C. power supply to the field coils of the generators in a simple, yet highly reliable manner. In addition thereto, the invention provides a control system having means for detecting the in-phase condition of two slowly rotating shafts and for automatically initiating a plurality of subsequent and related functions incidental to proper operation of an electrical power plant.

Although the invention is highly advantageous for automatically detecting the in-phase relationship of two turbine-generator rotors and for initiating the field excitation thereof, the invention may be employed for detecting the in-phase relationship of rotatable shafts of other rotatable apparatus and permits automation of many functions that heretofore have been manually detected and/or controlled.

While the invention has been shown in several forms, it will be obvious to those skilled in the art that it is not so limited, but is susceptible of various other changes and modifications without departing from the spirit thereof.

What is claimed is:

1. In combination, a first rotatable shaft and a second rotatable shaft, a single balanced electrical bridge circuit having a first pair of serially connected legs and a second pair of serially connected legs, means interconnected between said first pair of legs and said second pair of legs for sensing the condition of balance and unbalance in said bridge circuit, means provided on said first and second shafts for unbalancing said bridge circuit when said first and second shafts are disposed in the same rotative positions, and said sensing means including an electric relay for sensing the unbalance in said bridge circuit when said shafts are in the same rotative positions.

2. In combination,
   a first rotatable shaft and a second rotatable shaft,
   a balanced electrical bridge circuit having a first pair of serially connected legs and a second pair of serially connected legs,
   means interconnected between said pair of legs and said second pair of legs for sensing the condition of balance and unbalance in said bridge circuit, and
   means provided on said first and second shafts for unbalancing said bridge circuit when said first and second shafts are disposed in the same rotative positions, said unbalancing means on the first shaft being effective to unbalance said first pair of legs in one direction, said unbalancing means on the second shaft being effective to unbalance said second pair of legs in the opposite direction, and said sensing means being effective to sense the joint unbalance of both said pairs of legs and ineffective to sense the unbalance of only one of said pairs of legs.

3. In combination, a first rotatable shaft and a second rotatable shaft, a balanced electrical bridge circuit having a first pair of serially connected legs and a second pair of serially connected legs, a first impedance member disposed in one of said first pair of legs, a second impedance member disposed in one of said second pair of legs, means interconnected between said first pair of legs and said second pair of legs for sensing the condition of balance and unbalance in said bridge circuit, said first and second impedance members being disposed in spaced cooperative relation with said first and second shafts, respectively, and means provided on said first and second shafts for jointly varying the impedance of said first and second impedance members when said first and second shafts are disposed in the same rotative positions, whereby said bridge circuit is unbalanced.

4. In combination, a first rotatable shaft and a second rotatable shaft, a balanced electrical bridge circuit having a first pair of serially connected legs and a second pair of serially connected legs, a first impedance member disposed in one of said first pair of legs, a second impedance member disposed in one of said second pair of legs, means interconnected between said first pair of legs and said second pair of legs for sensing the condition of balance and unbalance in said bridge circuit, said first and second impedance members being disposed in spaced relation with said first and second shafts, respectively, and means provided on said first and second shafts for jointly varying the impedance of said first and second impedance members when said first and second shafts are disposed in the same rotative positions, whereby said bridge circuit is unbalanced, said first impedance member being disposed in the leg to the left of the serial connection and said second impedance member being disposed in the leg to the right of the serial connection, whereby when both pairs of legs are jointly unbalanced the voltage drop across said sensing means is twice the value attained when the first and second pairs of legs are individually unbalanced, and said sensing means being ineffective to sense the individual unbalance of said pairs of legs.

5. The combination recited in claim 3 and further including a first A.C. generator having a first rotor and a field winding, a second A.C. generator having a second rotor and a field winding, said first and second rotors being attached to said first and second shafts, respectively, means including a supply of D.C. current for energizing said field windings, means for individually driving said rotors at different slow speeds, and means actuated by the bridge unbalance sensing means for jointly connecting said D.C. supply to said field windings when said shafts are disposed in the same rotative positions.

6. A device for sensing the in-phase relationship of a first rotating shaft and a second rotating shaft in a plurality of predetermined rotative positions, comprising a plurality of A.C. bridge circuits, each of said bridge circuits having substantially identical electrical characteristics and including four legs, electrical impedance members disposed one in each of said legs and forming first and second pairs, the impedance ratio of said first pair of impedance members being equal to the impedance ratio of said second pair of impedance members, whereby all of said bridge circuits are electrically balanced, said first pair of impedance members including a first reference impedance member and a first variable impedance member connected in series and disposed in radially spaced relation with the periphery of said first shaft, said second pair of impedance members including a second reference impedance member and a second variable impedance member connected in series and disposed in radially spaced relation with the periphery of said second shaft, all of said first variable impedance members and said second variable impedance members being correspondingly peripherally spaced around their associated shafts, first means on said first shaft for successively varying the impedance of said first variable impedance members as said first shaft is rotated, second means on said second shaft for successively varying the impedance of said second variable impedance members, as said second shaft is rotated, said first and second impedance varying means being effective to jointly vary the impedance of said first and second variable impedance members in at least one of said bridge circuits when said shafts are disposed in phase with each other in one of said predetermined rotative positions, thereby unbalancing said one bridge circuit, and means responsive to the unbalance of said one bridge circuit for sensing the in-phase relationship of said shafts.

7. In combination, a first rotating shaft and a second rotating shaft, a device for sensing the in-phase relationship of said shafts in a plurality of predetermined rotative positions comprising, a plurality of A.C. bridge circuits each of said bridge circuits having substantially identical electrical characteristics and including first and second serially connected legs, third and fourth serially connected legs, of electrical impedance members disposed one in each of said legs and forming first and second pairs, the impedance ratio of said first pair of impedance members being unity and the impedance ratio of said second pair of impedance members being unity, whereby all of said bridge circuits are electrically balanced and the individual voltage drops across each of said first pair of impedance members are equal and the individual voltage drops across each of said second pair of impedance members are equal, said first pair of impedance members including a first reference impedance member and a first variable impedance member disposed in radially spaced relation with the periphery of said first shaft, said second pair of impedance members including a second reference impedance member and a second variable impedance member disposed in radially spaced relation with the periphery of said second shaft, all of said first variable impedance members and said second variable impedance members being correspondingly peripherally spaced around their associated shafts, first means on said first shaft for successively varying the impedance of each of said first variable impedance members and unbalancing the voltage drops across said first and second legs in one direction, second means on said second shaft for successively varying the impedance of each of said second variable impedance members and unbalancing the voltage drops across said third and fourth legs in the opposite direction, said first and second impedance varying means being effective to jointly vary the impedance of said first and second variable impedance members in at least one of said bridge circuits when said shafts are disposed in phase with each other in one of said predetermined rotative positions, thereby unbalancing the voltage drops in said one bridge circuit in opposite directions, means interconnected between the midpoints of said first and second legs and said third and fourth legs, said last mentioned means being responsive to the unbalance of said voltage drops in said one bridge circuit in opposite directions and sensing the in-phase relationship of said shafts, and means actuated by said voltage drop sensing means for interlocking said shafts for in-phase rotation.

8. In combination, a first A.C. generator having a rotor and a field winding, a second A.C. generator having a rotor and a field winding, means including a supply of D.C. current for energizing said field windings, means for driving said rotors at slow speeds, a balanced electrical bridge circuit having a first pair of serially connected legs and a second pair of serially connected legs, means interconnected between said first pair of legs and said second pair of legs for sensing the condition of unbalance in said bridge circuit, means associated with said first and second rotors for unbalancing said bridge circuit when said first and second rotors are disposed in the same rotative positions, and means actuated by said sensing means for concomitantly connecting said D.C. current supply to said field windings when said bridge circuit is unbalanced.

9. A device for sensing an in-phase rotative relationship of a first rotating shaft and second rotating shaft, comprising an A.C. bridge circuit having four legs, electrical impedance members disposed one in each of said legs and forming first and second pairs, the impedance ratios of said pairs of impedance members being equal, whereby said bridge circuit is electrically balanced, said first pair of impedance members being disposed in spaced relation with the periphery of said first shaft and said second pair of impedance members being disposed in spaced relation with the periphery of said second shaft, first means on said first shaft for varying the impedance of one of said first pair of impedance members, as it sweeps past said one of said first pair of impedance members, second means on said second shaft for varying the impedance of one of said second pair of impedance members as it sweeps past said one of said second pair of impedance members, said first and second impedance varying means being effective to jointly vary the impedance of their associated impedance members when the shafts are disposed in the same rotative positions with relation to each other, whereby said bridge is momentarily electrically unbalanced, and means responsive to the unbalance in said bridge for sensing the in-phase rotative position relationship of said shafts.

10. In combination, a first rotating shaft and a second rotating shaft, a device for sensing an in-phase rotative relationship of said shafts comprising an A.C. bridge circuit having four legs, electrical inductive impedance members disposed one in each of said legs and forming first and second pairs, the impedance ratios of said pairs of impedance members being equal, whereby said bridge circuit is electrically balanced, said first pair of impedance members being disposed in spaced relationship with the periphery of said first shaft and each forming a magnetic circuit therewith, said second pair of impedance members being disposed in spaced relation with said second shaft and each forming a magnetic circuit therewith, first means on said first shaft for varying the inductance of one of said first pair of impedance members, as it sweeps past said one of said first pair of impedance members, second means on said second shaft for varying the inductance of one of said second pair of impedance members as it sweeps past said one of said second pair of impedance members, said first and second inductance varying means being effective to jointly vary the inductance of their associated impedance members when the shafts are disposed in an in-phase position, whereby the impedance ratios of both said pairs of impedance members are rendered unequal and said bridge is electrically unbalanced, means responsive to the unbalance in said bridge for sensing the in-phase relationship of said shafts, and means actuated by said sensing means for initiating a subsequent control function.

References Cited by the Examiner
UNITED STATES PATENTS

| | | | |
|---|---|---|---|
| 1,890,891 | 12/32 | Vopel et al. | 340—268 X |
| 2,493,028 | 1/50 | Putt | 324—70 X |
| 2,731,599 | 1/56 | Groeper | 324—70 |
| 2,828,481 | 3/59 | Latapie | 340—268 |
| 2,943,307 | 6/60 | Sampson | 317—6 X |

SAMUEL BERNSTEIN, *Primary Examiner.*